(12) United States Patent
Brown et al.

(10) Patent No.: US 10,719,700 B1
(45) Date of Patent: Jul. 21, 2020

(54) OPTICAL CHARACTER RECOGNITION IMPROVEMENT BASED ON INLINE LOCATION DETERMINATION

(71) Applicant: LendingClub Corporation, San Francisco, CA (US)

(72) Inventors: Aaron Brown, San Francisco, CA (US); Ryan Kois, San Francisco, CA (US); Naman Patel, San Ramon, CA (US); Garen Mnatsakanov, San Francisco, CA (US); Binyomin Einstein, San Francisco, CA (US); Sarah-Beth Zoto, San Francisco, CA (US)

(73) Assignee: LendingClub Corporation, San Francisco, CA (US)

(\*) Notice: Subject to any disclaimer, the term of this patent is extended or adjusted under 35 U.S.C. 154(b) by 136 days.

(21) Appl. No.: 16/007,702

(22) Filed: Jun. 13, 2018

(51) Int. Cl.
*G06K 9/00* (2006.01)
*G06F 16/583* (2019.01)
*G06F 16/58* (2019.01)

(52) U.S. Cl.
CPC ..... *G06K 9/00456* (2013.01); *G06F 16/5846* (2019.01); *G06F 16/5866* (2019.01); *G06K 9/00463* (2013.01); *G06K 2209/015* (2013.01)

(58) Field of Classification Search
CPC ........... G06K 9/00456; G06K 9/00463; G06K 2209/015; G06F 16/5846; G06F 16/5866
See application file for complete search history.

(56) References Cited

U.S. PATENT DOCUMENTS

| | | | | |
|---|---|---|---|---|
| 5,307,459 A | \* | 4/1994 | Petersen | H04L 29/06 709/234 |
| 5,721,955 A | \* | 2/1998 | Cedros | H04L 49/901 710/33 |
| 2003/0081846 A1 | \* | 5/2003 | Whitehead | H04N 1/64 382/239 |
| 2003/0087650 A1 | \* | 5/2003 | Aarnio | G06F 17/289 455/456.3 |
| 2011/0025715 A1 | \* | 2/2011 | Uchida | H04N 1/00408 345/660 |

(Continued)

FOREIGN PATENT DOCUMENTS

WO   WO/2016/071903   \* 12/2016

*Primary Examiner* — Ming Y Hon
(74) *Attorney, Agent, or Firm* — Hickman Palermo Becker Bingham LLP

(57) ABSTRACT

Techniques for optical character recognition improvement based on inline location determination is provided. The techniques include receiving a digital data stream containing a digital image. As the digital data stream arrives, a determination is made whether a number of received bytes associated with a header portion of the digital image has reached a target number. In response to determining that the number of received bytes associated with the header portion of the digital image has reached the target number, the bytes associated with the header portion of the digital image are cloned. While the digital data stream is received, location data from the cloned bytes associated with the header portion are determined. After the digital image has been received, text in the digital image is caused to be recognized by an optical character recognition system based, at least in part, on the location data.

20 Claims, 4 Drawing Sheets

(56) References Cited

U.S. PATENT DOCUMENTS

| | | | | |
|---|---|---|---|---|
| 2014/0009612 | A1* | 1/2014 | King | B66F 9/0755 |
| | | | | 348/143 |
| 2014/0025651 | A1* | 1/2014 | Schreter | G06F 12/0261 |
| | | | | 707/695 |
| 2015/0121025 | A1* | 4/2015 | Wu | G06F 3/0665 |
| | | | | 711/162 |
| 2015/0317569 | A1* | 11/2015 | Renaudie | G06Q 10/02 |
| | | | | 705/5 |
| 2016/0171627 | A1* | 6/2016 | Lyubarskiy | G06Q 40/12 |
| | | | | 705/30 |
| 2017/0031769 | A1* | 2/2017 | Zheng | G06F 3/0659 |
| 2018/0189786 | A1* | 7/2018 | Poole | G06K 9/00463 |

* cited by examiner

OPTICAL CHARACTER RECOGNITION IMPROVEMENT BASED ON INLINE LOCATION DETERMINATION

FIELD OF THE INVENTION

The present invention relates to optical character recognition, and more specifically relates to optical character recognition improvement based on inline location determination.

BACKGROUND

System may have as input digital images that need to have optical character recognition (OCR) performed on them. Some systems use generic OCR for any document that comes in. That can cause numerous issues, however. For example, if the general textual structure or format of the document is not known, then the OCR may be difficult to perform and may result in misinterpretation of the data. As a more specific example, performing OCR on numerous driver's licenses from different states may result in text being determined, but it may be difficult or impossible to know what that text represents on the driver's license without further knowledge of the textual structure or format of the driver's license.

Techniques herein address these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The claims serve as a summary of the invention.

DETAILED DESCRIPTION

Figure 1:
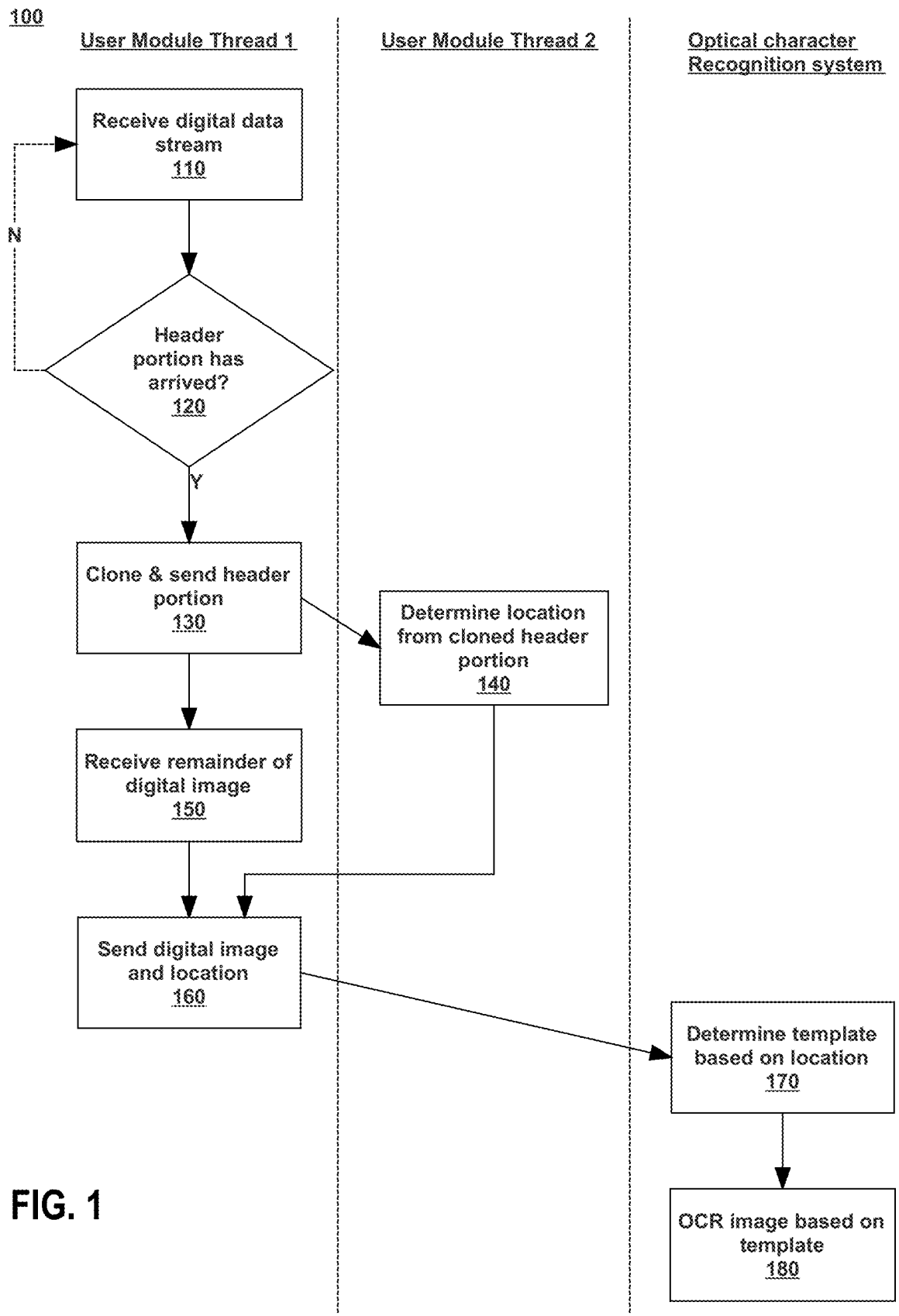
FIG. 1 is a flow diagram depicting a process for optical character recognition improvement based on inline location determination.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

As discussed herein, without using the techniques herein, systems can have issues performing optical character recognition on digital images when the format and structure of the data in those images is unknown. For example, if a system is taking as input images of documents associated with governmental geographic regions, such as cities, states, countries, etc., then without the knowledge of what geographic region the image is associated with, the system can't perform optical character recognition using a template associated specifically with that geographic region. Techniques herein address these issues.

Techniques are provided herein for improved optical character recognition based on inline location determination. In some embodiments, the techniques herein proceed by receiving a digital data stream, such as the bytes of an image. When a header portion of that digital data stream has arrived, a new thread may be spawned, and the header portion of the digital data stream may be cloned and sent to that second thread. In some embodiments, instead of a second thread being spawned, a JavaScript Web Worker is invoked. The second thread (or Web Worker) may then determine the location from the header portion. In some embodiments the format of the header portion may not be known and therefore the header portion may be cast in various types until it can be determined what data type the header portion is in, and the location in the header portion. Locations in the header portion are often added by the cameras themselves and placed in the header portion as Exchangeable image file format (EXIF) data. While the second thread is determining the location from the header portion, the main thread will continue to receive the remainder of the digital image. Once the second thread determines the location for the header portion, it sends it back to the main thread. Once the main thread has both the remainder of the digital image and the location received from the second thread, it will send the digital image and the location to an optical character recognition system. The optical character recognition system will determine a template to use for the optical character recognition based on the location. OCR will be performed based on the template.

Vehicle registrations, driver's licenses, etc. differ state by state in the United States. Knowing what state is associated with a driver's license or vehicle registration would allow a system to use a template specific to that state. Therefore, the optical character recognition can not only determine where to find particular data based on the optical character recognition template, but also what format that data will be in. For example, driver's license numbers may differ in format, number of characters, and length from one driver's license to another. Further, the driver's license number may be in different places on different driver's licenses. When a user is asked to take a picture of their driver's license, vehicle registration, or anything else, they can take a picture using a camera, such as the one on a smartphone, and that picture may include EXIF data that will show the location the picture was taken at. That location, assuming the picture was taken in the same state as the document was issued, will indicate what template to use. The techniques herein take advantage of all of this information and provide an improved optical character recognition system based on inline location determination.

As an example, a system may receive an image of a driver's license from a particular state. The location determined from the header data will indicate the state of the driver's license. From there the optical character recognition system will be able to determine a template, based on the location of the image, to use to recognize the text in the format of that state's driver's license. In using the techniques herein, the optical character recognition system will be able to better recognize the text, and its meaning, in the digital image. Using the techniques herein will improve the outcome of the optical character recognition of the digital images, based on the location data.

Example Process for Optical Character Recognition Improvement Based on Inline Location Determination FIG. 1 is a flow diagram depicting a process 100 for optical character recognition improvement based on inline location determination. Generally, a first thread in a user module will receive 110 a digital data stream. As the thread is receiving the digital data stream, it will check to see whether data corresponding to the size of a header portion has arrived 120. If the header portion has not arrived 120, it continues receiving 110 the digital data stream. Once the header portion has arrived 120, the thread will clone 130 the header portion and send it to a second thread (or JavaScript Web Worker). The second thread or Web Worker will receive the header portion and determine 140 location data from the header portion. The second thread will then send the location data back to the main thread. While the second thread is determining 140 location data from the header portion the main thread will continue to receive 150 the remainder of the digital image. Once the main thread has received the remainder of the digital image and received the location from the second thread, it will send 160 the digital image and location data to an optical character recognition system. The optical character recognition system will determine 170 a template to use on the digital image for optical character recognition based on the location data received. The optical character recognition system will then OCR 180 the image based on the determined template.

Returning again to the top of process 100, the main thread of the user module will receive 110 the digital data stream. Receiving a digital data stream can take many forms, such as receiving an uploaded file in a browser, receiving a digital data stream via an HTTP, HTTPS, FTP, SSL, TCP/IP, UDP, and/or any other communication mechanism. Typically, a digital data stream will be received bit-by-bit or byte-by-byte until it has arrived completely. While the digital data stream is arriving and being received 110, a determination can be made by the main thread of the user module whether a portion of the digital data stream corresponding to the header has arrived 120. Headers on digital images may be 126 bytes long, or any other appropriate size. If the header portion of the digital data stream has not arrived 120, the main thread of the user module will continue to receive 110 the digital data stream.

Once the header portion of the digital data stream has arrived 120 that portion can be cloned 130 and sent to a second thread of the user module. In some embodiments the second thread of the user module is spawned as part of the cloning and sending of the header portion. In other embodiments the second thread of the user module already exists and is awaiting receipt of the cloned header portion. Further, in some embodiments instead of using a second thread of the same user module the determination of the location from the header portion may be performed by a separate process, on the same or a different computer or computing device, or the like. Cloning 130 the header portion of the digital data stream may take any appropriate form including, copying the memory into which the header portion of the digital data stream has arrived.

Once the second thread of the user module has received the cloned header portion of the digital data stream, it will determine 140 location data from the header portion. As noted elsewhere herein, in some embodiments, the data type of the header may not be known. In that case, the header portion of the digital data stream may be cast into various data types until the proper data type has been found and the location can be determined. For example, the header portion may be cast as any or all of the following, or other types not listed here:

BYTE—An 8-bit unsigned integer.
ASCII—An 8-bit byte containing one 7-bit ASCII code. The final byte is terminated with NULL.
SHORT—A 16-bit (2-byte) unsigned integer.
LONG—A 32-bit (4-byte) unsigned integer.
RATIONAL—Two LONGs. The first LONG is the numerator and the second LONG expresses the denominator.
UNDEFINED—An 8-bit byte that can take any value depending on the field definition.
SLONG—A 32-bit (4-byte) signed integer (2's complement notation).
SRATIONAL—Two SLONGs. The first SLONG is the numerator and the second SLONG is the denominator.

After casting the header portion of the digital data stream, or if the type of the digital data stream is already known, location can be determined from the header portion of the digital data stream that has been cloned and received at the second module thread. In some embodiments, EXIF data includes latitude and longitude coordinates. The latitude and longitude coordinates can be used to determinate governmental geographic region associative with those coordinates. For example, the latitude and longitude may be global positioning system coordinates, and those global positioning coordinate system may be used to determine what state a driver's license picture was take. In some embodiments, the second thread of the user module determines 140 not only location data from the header portion but also the governmental region associative with the location data. In other embodiments, the optical character recognition system will receive the location coordinates from the first thread of the user module and then determine the template based on those location coordinates.

After the first thread of the user module has cloned 130 and sent the header portion to the second thread, and while the second thread is determining 140 the location from the header portion, the first thread will continue to receive 150 the remainder of the digital image. Embodiments of receiving the digital image is discussed elsewhere herein. After the first thread of the user module has received 150 the remainder of the digital image and has received the location information sent by the second thread of the user module, then it will send 160 the digital image and location information to the optical character recognition system. Sending the digital image and location to the optical character recognition system can take many forms, including sending it over a network, via a particular protocol such as FTP, FTPS, HTTP, HTTPS, SSL, UDP, etc.

After the optical character recognition system has received the digital image and the location data, it can determine 170 a template based on the location. Determining 170 a template based on location data can take any appropriate form. For example, the optical character recognition system may look up a governmental geographic region associated with the location data received from the user module. The received coordinates may be global positioning system coordinates, such as latitude and longitude, and the optical character recognition system may look up a state or other region associated with those geographic coordinates. That governmental geographic region may then be used to determine which optical character recognition template to use to perform optical character recognition on the received image based on the determine governmental geographic region. For example, if the global positioning system coordinates received indicate that the picture was taken in Arizona, then a template for an Arizona driver's license may be used to perform optical character recognition on the digital image.

Using the techniques herein, the optical character recognition system will be able to better perform optical character recognition on the incoming digital images. By knowing the location associated with the digital image, the optical character recognition system will use an appropriate template for performing the optical character recognition. Using the appropriate template will improve the optical character recognition by informing the optical character recognition system where to find data, how the data will be formatted, and what the data means depending on its location.

Figure 3:
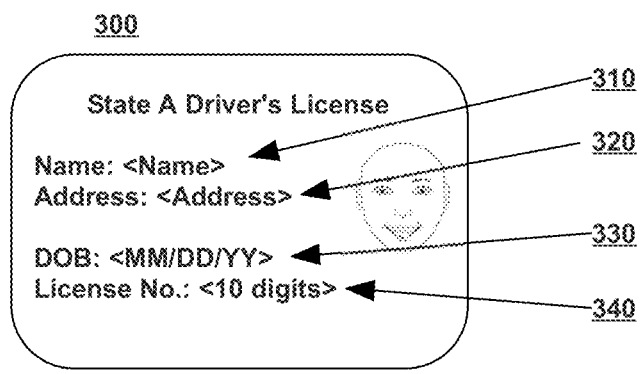
FIG. 3 and FIG. 4 depict example images on which to perform improved optical character recognition based on inline location determination.
Figure 4:
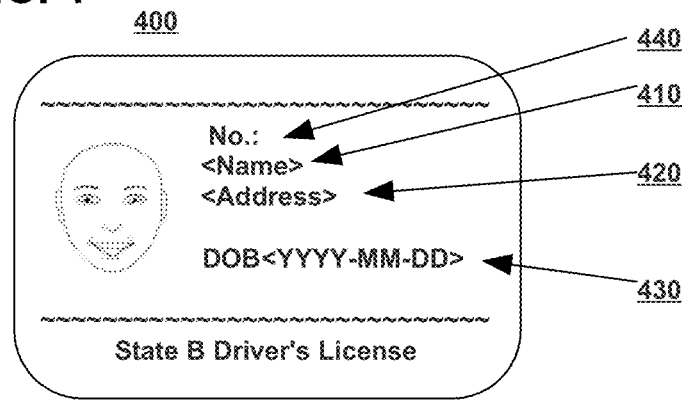

Turning to specific examples, FIG. 3 and FIG. 4 depict images 300 and 400 of two driver's licenses with notably different formats. The image 300 of state A's driver's license has the name 310 above the address 320, which is above the date of birth 330 and the license number 340. The image 400 of state B's driver's license has the license number 440 above the name 410, above the address 420, and the date of birth 430 is below. It is also notable that, as depicted in image 300, the name 310 is preceded by a tag indicating that it is the name. This is also the case for the address 320, date of birth 330, and license number 340. As depicted in image 400, the license number 440 is preceded with a tag "NO.," but the name 410 and address 420 are not preceded with tags. It is also notable that the date format for the date of birth 330 is different than the date format for the date of birth 430. Knowing all of these subtleties of the formatting of the two different state's driver's licenses, the optical character recognition system can more easily detect the appropriate information in the digital image, such as name, address, date of birth, and license number, and know the format that the data is in.

Not depicted in process 100, if a location cannot be determined 140 from the header portion or there is no template corresponding to that location, then the optical character recognition system may attempt to perform optical character recognition using a generic template. In other embodiments, if there is no location in the digital image or template associated with a location, then a flag or error can be sent back to the user module, which will indicate to the user module that it should request that the information from the digital image be inputted manually.

Figure 2:
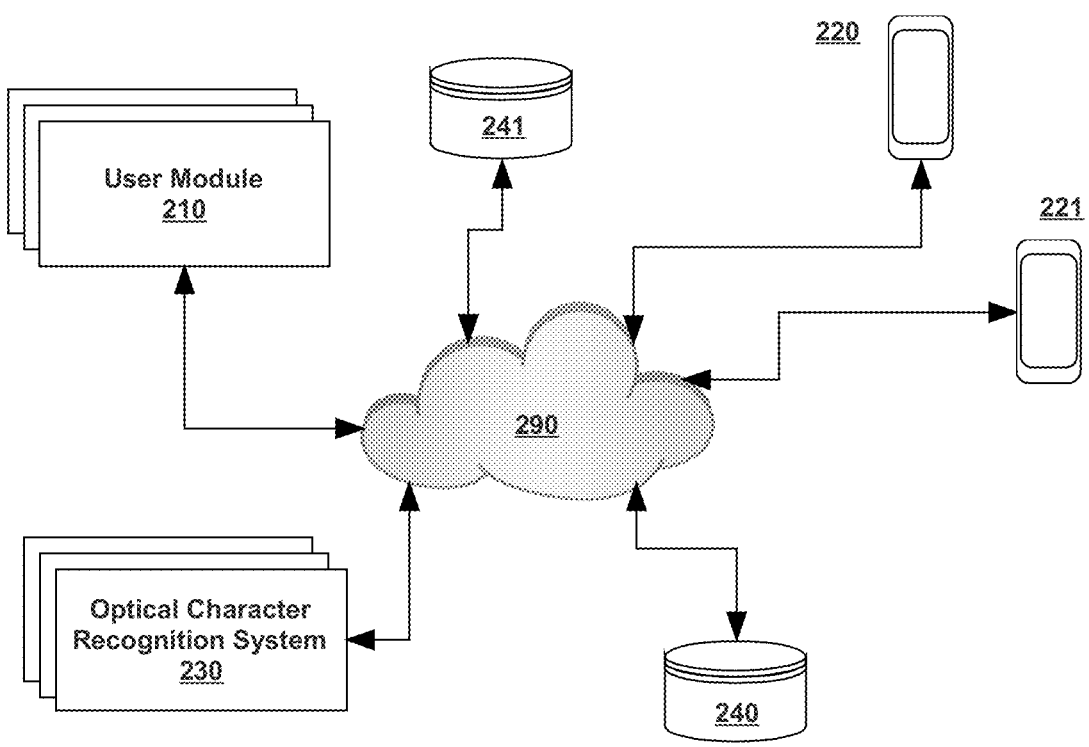
FIG. 2 is a block diagram depicting a system for optical character recognition improvement based on inline location determination.

Example Systems for Optical Character Recognition Improvement Based on Inline Location Determination FIG. 2 is a block diagram depicting a system 200 for optical character recognition improvement based on inline location determination. Various devices are coupled to a network 290 in the system 200. The network may be an internet, intranet, private network, or any other appropriate network or combination of networks. The user module 210 is coupled to the network. The user module 210 may perform various steps, such as those indicated in process 100. The user module may contain a single thread and/or multiple threads which run on a single processor and/or multiple processors or other computing devices.

An optical character recognition system 230 is also coupled to network 290. The optical character recognition system 230 may, as discussed elsewhere herein, receive location information and digital images and perform optical character recognition based on templated determined using the location information.

As depicted in system 200, one or more storage elements 240 and 241 may be connected to network 290. Storage 240 and 241 may be used to store digital data streams, OCR templates, and/or location information. Further, storage 240 and/or 241 may also store templates for use by the optical character recognition system 230. In some embodiment, optical character recognition system 230 and user module 210 may have local storage instead of or separate from storage 240 and 241. Also, coupled to network 290 are two user devices 220 and 221. User devices 220 and 221 may be used by users in order to take pictures of items such as driver's licenses, vehicle registrations, or other digital images for use with the systems and techniques described herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
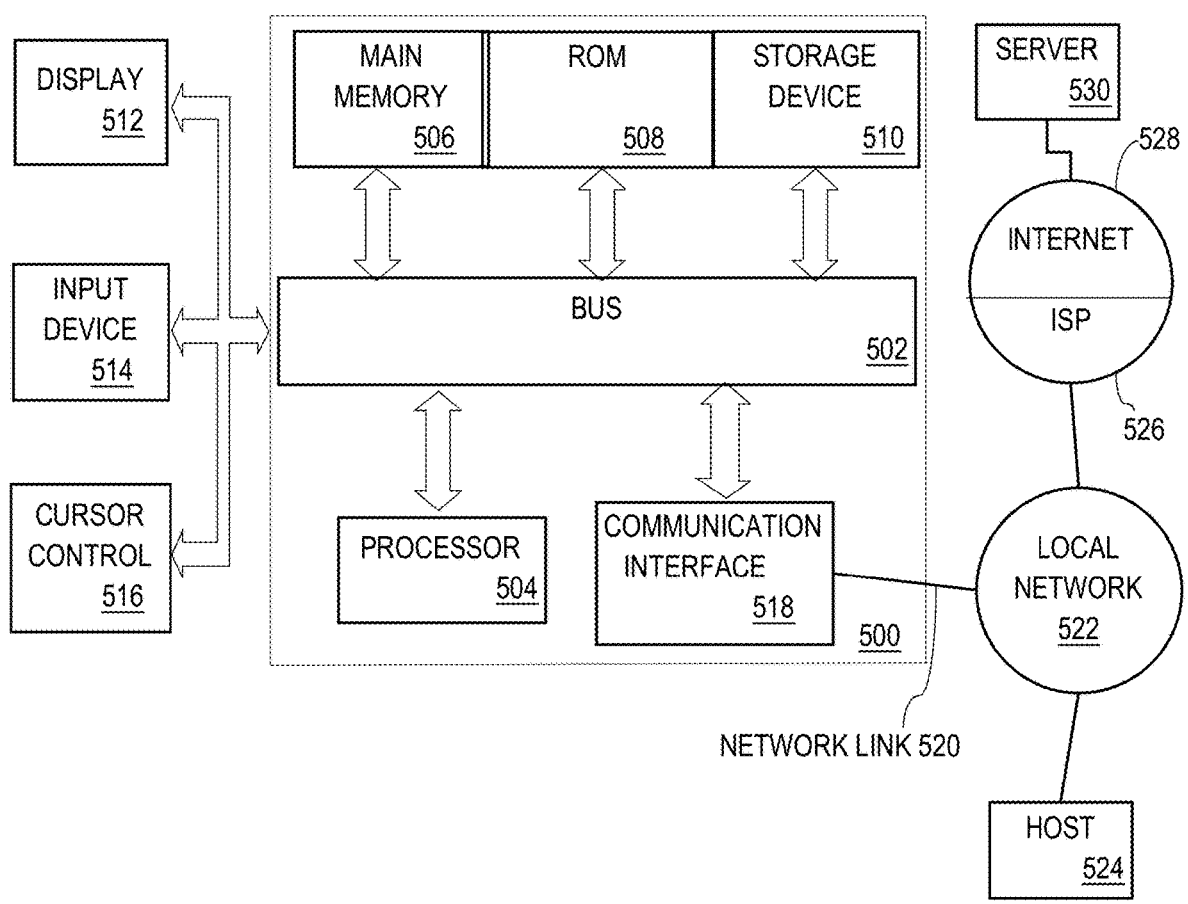
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system for geolocation-based optical character recognition, comprising:
    a user module executing on one or more user computing devices, and
    an optical character recognition system executing on one or more computing devices;
    wherein the user module is configured to execute user module instructions, which, when executed, perform the steps of:
    receiving a digital data stream containing a digital image;
    as the digital data stream arrives, determining whether a number of received bytes associated with a header portion of the digital image has reached a target number;
    in response to determining that the number of received bytes associated with the header portion of the digital image has reached the target number, cloning the bytes associated with the header portion of the digital image;
    while the digital data stream continues to be received, determining location data from the cloned bytes associated with the header portion;
    determining a particular region that corresponds to the location data; and
    after the digital image has been received, causing text in the digital image to be analyzed by the optical character recognition system based, at least in part, on a predefined template specific to the particular region, that assists the optical recognition system by specifying expected formatting and relative locations of desired information in digital images from the particular region.

2. The system of claim 1, wherein the optical character recognition system is configured to perform the steps of:
receiving the determined particular region corresponding to the location data and the digital image from the user module;
receiving a determined other region corresponding to location data associated with an other digital image, and the other digital image from the user module;
determining whether there is a predefined template specific to the other region for recognizing characters in the digital image;
in response to determining that there is the predefined template specific to the other region, recognizing text in the other digital image based on the predefined template specific to the other region;
sending the recognized text from the other image to the user module.

3. The system of claim 2, wherein the optical character recognition system is further configured to perform the step of:
in response to determining that there is no predefined template specific to the other region, recognizing text in the other digital image based on a generic optical character recognition template.

4. The system of claim 2, wherein the optical character recognition system is further configured to perform the steps of:
in response to determining that there is no predefined template specific to the other region, flagging an exception to the user module, wherein the user module is configured to, upon receiving the exception, to prompt a user of the user module for manual input of text data contained in the other digital image.

5. The system of claim 2, wherein determining the particular region that corresponds to the location data comprises:
determining location data comprising global positioning system coordinates from the cloned bytes associated with the header portion; and
determining a governmental geographic region associated with the global positioning system coordinates, wherein the particular region is the governmental geographic region, and wherein the predefined template is a particular optical character recognition template associated with the governmental geographic region, and is used for recognizing characters in the other digital image.

6. A method for geolocation-based optical character recognition, comprising:
receiving, using one or more computing devices, a digital data stream containing a digital image;
as the digital data stream arrives, determining, using the one or more computing devices, whether a number of received bytes associated with a header portion of the digital image has reached a target number;
in response to determining that the number of received bytes associated with the header portion of the digital image has reached the target number, cloning, using the one or more computing devices, the bytes associated with the header portion of the digital image;
while the digital data stream continues to be received, determining, using the one or more computing devices, location data from the cloned bytes associated with the header portion;
determining a particular region that corresponds to the location data; and
after the digital image has been received, causing, using the one or more computing devices, text in the digital image to be analyzed by an optical character recognition system based, at least in part, on a predefined template specific to the particular region, that assists the optical character recognition system by specifying expected formatting and relative locations of desired information in digital images from the particular region.

7. The method of claim 6, further comprising:
receiving, at an optical character recognition system, the determined particular region corresponding to the location data and the digital image from the one or more computing devices;
further receiving, at the optical character recognition system, a determined other region corresponding to location data associated with an other digital image, and the other digital image from the one or more computing devices;
determining, at the optical character recognition system, whether there is a predefined template specific to the other region for recognizing characters in the digital image;
in response to determining that there is the predefined template specific to the other region, recognizing, at the optical character recognition system, text in the other digital image based on the predefined template specific to the other region;
sending the recognized text from the other image to the one or more computing devices.

8. The method of claim 7, further comprising:
in response to determining that there is no predefined template specific to the other region, recognizing, at the optical character recognition system, text in the other digital image based on a generic optical character recognition template.

9. The method of claim 7, further comprising:
in response to determining that there is no predefined template specific to the other region, flagging, at the optical character recognition system, an exception to the one or more computing devices, wherein the one or more computing devices are configured to, upon receiving the exception, to prompt a user of the one or more computing devices for manual input of text data contained in the other digital image.

10. The method of claim 7, wherein determining the particular region that corresponds to the location data comprises:
determining location data comprising global positioning system coordinates from the cloned bytes associated with the header portion; and
determining a governmental geographic region associated with the global positioning system coordinates, wherein the particular region is the governmental geographic region, and wherein the predefined template is a particular optical character recognition template associated with the governmental geographic region, and is used for recognizing characters in the other digital image.

11. One or more non-transitory storage media storing instructions which, when executed by one or more computing devices, cause performance of a process comprising:
- receiving, using the one or more computing devices, a digital data stream containing a digital image;
- as the digital data stream arrives, determining, using the one or more computing devices, whether a number of received bytes associated with a header portion of the digital image has reached a target number;
- in response to determining that the number of received bytes associated with the header portion of the digital image has reached the target number, cloning, using the one or more computing devices, the bytes associated with the header portion of the digital image;
- while the digital data stream continues to be received, determining, using the one or more computing devices, location data from the cloned bytes associated with the header portion;
- determining a particular region that corresponds to the location data; and
- after the digital image has been received, causing, using the one or more computing devices, text in the digital image to be analyzed by an optical character recognition system based, at least in part, on a predefined template specific to the particular region, that assists the optical character recognition system by specifying expected formatting and relative locations of desired information in digital images from the particular region.

12. The one or more non-transitory storage media of claim 11, further comprising:
- receiving, at an optical character recognition system, the determined particular region corresponding to the location data and the digital image from the one or more computing devices;
- receiving a determined other region corresponding to location data associated with an other digital image, and the other digital image from the one or more computing devices;
- determining, at the optical character recognition system, whether there is a predefined template specific to the other region for recognizing characters in the other digital image;
- in response to determining that there is the predefined template specific to the other region, recognizing, at the optical character recognition system, text in the other digital image based on the predefined template specific to the other region;
  - sending the recognized text from the other image to the one or more computing devices.

13. The one or more non-transitory storage media of claim 12, further comprising:
- in response to determining that there is no predefined template specific to the other region, recognizing, at the optical character recognition system, text in the other digital image based on a generic optical character recognition template.

14. The one or more non-transitory storage media of claim 12, further comprising:
- in response to determining that there is no predefined template specific to the other region, flagging, at the optical character recognition system, an exception to the one or more computing devices, wherein the one or more computing devices are configured to, upon receiving the exception, to prompt a user for manual input of text data in the other digital image.

15. A system for geolocation-based optical character recognition, comprising:
- a user module executing on one or more user computing devices, and
- an optical character recognition system executing on one or more computing devices;
- wherein the user module is configured to execute user module instructions, which, when executed, perform the steps of:
  - receiving a digital data stream containing a digital image;
  - as the digital data stream arrives, determining whether a number of received bytes associated with a header portion of the digital image has reached a target number;
  - in response to determining that the number of received bytes associated with the header portion of the digital image has reached the target number, cloning the bytes associated with the header portion of the digital image;
  - while the digital data stream continues to be received, determining location data from the cloned bytes associated with the header portion by iteratively casting the cloned bytes associated with the header portion in a data type;
  - for each attempt to cast the cloned bytes associated with the header portion in the data type:
    - determining whether the data type matches the cloned bytes associated with the header portion by analyzing data in the cloned bytes associated with the header portion cast in the data type;
    - in response to determining that the cloned bytes associated with the header portion are properly cast in the data type, determining location data from the cloned bytes associated with the header portion cast in the data type; and
    - in response to determining that the cloned bytes associated with the header portion are not properly cast in the data type, continuing to iteratively cast from the cloned bytes associated with the header portion in additional data types;
  - after the digital image has been received, causing text in the digital image to be recognized by an optical character recognition system based, at least in part, on the location data.

16. A system for geolocation-based optical character recognition, comprising:
- a user module executing on one or more user computing devices;
- an optical character recognition system executing on one or more computing devices;
- wherein the user module is running on a first thread on one or more user computing devices; and
- wherein the user module is configured to execute user module instructions, which, when executed, perform the steps of:
  - receiving a digital data stream containing a digital image;
  - as the digital data stream arrives, determining whether a number of received bytes associated with a header portion of the digital image has reached a target number;
  - in response to determining that the number of received bytes associated with the header portion of the digital image has reached the target number:
    - cloning the bytes associated with the header portion of the digital image;

spawning a second thread on the one or more user computing devices, the second thread running on the one or more user computing devices; and sending the cloned bytes associated with the header portion to the second thread;

while the digital data stream continues to be received, determining location data from the cloned bytes associated with the header portion using the second thread on the one or more user computing devices, which is configured to perform the steps of:

receiving the cloned bytes associated with the header portion;

determining the location data from the cloned bytes associated with the header portion; and sending the location data to the first thread on the one or more user computing devices;

after the digital image has been received, causing text in the digital image to be recognized by an optical character recognition system based, at least in part, on the location data.

17. A method for geolocation-based optical character recognition, comprising:

receiving, using one or more computing devices, a digital data stream containing a digital image;

as the digital data stream arrives, determining, using the one or more computing devices, whether a number of received bytes associated with a header portion of the digital image has reached a target number;

in response to determining that the number of received bytes associated with the header portion of the digital image has reached the target number, cloning, using the one or more computing devices, the bytes associated with the header portion of the digital image;

while the digital data stream continues to be received, determining, using the one or more computing devices, location data from the cloned bytes associated with the header portion by iteratively casting the cloned bytes associated with the header portion in a data type;

for each attempt to cast the cloned bytes associated with the header portion in the data type:

determining whether the data type matches the cloned bytes associated with the header portion by analyzing data in the cloned bytes associated with the header portion cast in the data type;

in response to determining that the cloned bytes associated with the header portion are properly cast in the data type, determining location data from the cloned bytes associated with the header portion cast in the data type; and in response to determining that the cloned bytes associated with the header portion are not properly cast in the data type, continuing to iteratively cast from the cloned bytes associated with the header portion in additional data types;

after the digital image has been received, causing, using the one or more computing devices, text in the digital image to be recognized by an optical character recognition system based, at least in part, on the location data.

18. A method for geolocation-based optical character recognition, comprising:

receiving, using one or more computing devices, a digital data stream containing a digital image;

as the digital data stream arrives, determining, using the one or more computing devices, whether a number of received bytes associated with a header portion of the digital image has reached a target number;

in response to determining that the number of received bytes associated with the header portion of the digital image has reached the target number:

cloning, using the one or more computing devices, the bytes associated with the header portion of the digital image;

spawning a second thread on the one or more computing devices, the second thread running on the one or more computing devices;

sending the cloned bytes associated with the header portion to the second thread; and receiving, at the second thread on the one or more computing devices, the cloned bytes associated with the header portion;

while the digital data stream continues to be received, determining, at the second thread on the one or more computing devices, location data from the cloned bytes associated with the header portion;

sending, at the second thread on the one or more computing devices, the location data to a first thread on the one or more computing devices; and after the digital image has been received, causing, using the one or more computing devices, text in the digital image to be recognized by an optical character recognition system based, at least in part, on the location data.

19. One or more non-transitory storage media storing instructions which, when executed by one or more computing devices, cause performance of a process comprising:

receiving, using the one or more computing devices, a digital data stream containing a digital image;

as the digital data stream arrives, determining, using the one or more computing devices, whether a number of received bytes associated with a header portion of the digital image has reached a target number;

in response to determining that the number of received bytes associated with the header portion of the digital image has reached the target number, cloning, using the one or more computing devices, the bytes associated with the header portion of the digital image;

while the digital data stream continues to be received, determining, using the one or more computing devices, location data from the cloned bytes associated with the header portion by iteratively casting the cloned bytes associated with the header portion in a data type;

for each attempt to cast the cloned bytes associated with the header portion in the data type:

determining whether the data type matches the cloned bytes associated with the header portion by analyzing data in the cloned bytes associated with the header portion cast in the data type;

in response to determining that the cloned bytes associated with the header portion are properly cast in the data type, determining location data from the cloned bytes associated with the header portion cast in the data type; and in response to determining that the cloned bytes associated with the header portion are not properly cast in the data type, continuing to iteratively cast from the cloned bytes associated with the header portion in additional data types;

after the digital image has been received, causing, using the one or more computing devices, text in the digital image to be recognized by an optical character recognition system based, at least in part, on the location data.

20. One or more non-transitory storage media storing instructions which, when executed by one or more computing devices, cause performance of a process comprising:

receiving, using the one or more computing devices, a digital data stream containing a digital image;

as the digital data stream arrives, determining, using the one or more computing devices, whether a number of received bytes associated with a header portion of the digital image has reached a target number;

in response to determining that the number of received bytes associated with the header portion of the digital image has reached the target number:

cloning, using the one or more computing devices, the bytes associated with the header portion of the digital image;

spawning a second thread on the one or more computing devices, the second thread running on the one or more computing devices;

sending the cloned bytes associated with the header portion to the second thread;

receiving, at the second thread on the one or more computing devices, the cloned bytes associated with the header portion;

while the digital data stream continues to be received, determining, at the second thread on the one or more computing devices, location data from the cloned bytes associated with the header portion;

sending, at the second thread on the one or more computing devices, the location data to a first thread on the one or more computing devices; and after the digital image has been received, causing, using the one or more computing devices, text in the digital image to be recognized by an optical character recognition system based, at least in part, on the location data.

* * * * *